(12) United States Patent
Saxena et al.

(10) Patent No.: US 11,314,565 B2
(45) Date of Patent: Apr. 26, 2022

(54) METHOD AND SYSTEM FOR APPLICATION VIRTUALIZATION THAT INCLUDES RESOURCE ACCESS CONTROL

(71) Applicant: DATA ACCELERATOR LTD, London (GB)

(72) Inventors: Priya Saxena, Essex (GB); Jason Efstathiou, London (GB); Martin Bernard Kirkby, Leeds (GB); Matthew Philip Clothier, Chedzoy (GB)

(73) Assignee: DATA ACCELERATOR LTD, London (GB)

( * ) Notice: Subject to any disclaimer, the term of this patent is extended or adjusted under 35 U.S.C. 154(b) by 55 days.

(21) Appl. No.: 15/887,455

(22) Filed: Feb. 2, 2018

(65) Prior Publication Data

US 2018/0181451 A1  Jun. 28, 2018

Related U.S. Application Data

(63) Continuation-in-part of application No. 15/355,857, filed on Nov. 18, 2016, and a continuation-in-part of application No. 15/392,965, filed on Dec. 28, 2016, now Pat. No. 11,150,925.

(60) Provisional application No. 62/454,002, filed on Feb. 2, 2017, provisional application No. 62/359,507, filed on Jul. 7, 2016.

(51) Int. Cl.
*G06F 9/54* (2006.01)
*G06F 9/455* (2018.01)
*G06F 21/62* (2013.01)
*G06F 21/53* (2013.01)

(52) U.S. Cl.
CPC .............. *G06F 9/545* (2013.01); *G06F 9/455* (2013.01); *G06F 9/45537* (2013.01); *G06F 9/45545* (2013.01); *G06F 21/53* (2013.01); *G06F 21/629* (2013.01)

(58) Field of Classification Search
None
See application file for complete search history.

(56) References Cited

U.S. PATENT DOCUMENTS

| | | | |
|---|---|---|---|
| 8,826,273 B1 | 9/2014 | Chen | |
| 8,904,081 B1 * | 12/2014 | Kulkarni | G06F 9/45558 711/6 |
| 8,938,808 B1 * | 1/2015 | Spertus | G06F 21/53 726/27 |
| 10,097,560 B1 * | 10/2018 | Shavell | H04L 63/107 |
| 2008/0106404 A1 * | 5/2008 | Joslin | G01D 9/005 340/540 |

(Continued)

*Primary Examiner* — Chat C Do
*Assistant Examiner* — William C Wood

(57) ABSTRACT

A method for executing a virtualized application on a computing system that includes a user-space and a kernel-space is disclosed. The method includes executing an application in the user-space, executing a user-level virtualization layer in the user-space, the user-level virtualization layer including a set of rules, performing, via the user-level virtualization layer, user-level hooking of events that are generated by the executing application according to the set of rules to identify events of interest, and determining whether to allow or block a function corresponding to an event that is identified as an event of interest based on the set of rules in the user-level virtualization layer.

14 Claims, 16 Drawing Sheets

(56) References Cited

U.S. PATENT DOCUMENTS

| | | |
|---|---|---|
| 2009/0228421 A1 | 9/2009 | Citeau |
| 2012/0088584 A1 | 4/2012 | Mamtani et al. |
| 2013/0347009 A1 | 12/2013 | Hall |
| 2014/0137184 A1* | 5/2014 | Russello ................ G06F 21/60 726/1 |
| 2014/0173700 A1* | 6/2014 | Awan .................... H04L 63/107 726/4 |
| 2015/0036919 A1* | 2/2015 | Bourdev ............. G06K 9/6256 382/156 |
| 2017/0060605 A1 | 3/2017 | Huang et al. |
| 2017/0147316 A1 | 5/2017 | Reierson et al. |
| 2017/0201541 A1* | 7/2017 | Kapoor ............... H04L 63/1425 |
| 2017/0243001 A1 | 8/2017 | Jawa et al. |
| 2017/0249374 A1* | 8/2017 | Parees ...................... G06F 9/44 |

* cited by examiner

| # DOMAIN | USER | IP | ACCESS |
|---|---|---|---|
| DOCTOR | TOM | SUBNET IP | ALLOW |
| DOCTOR | TOM | OUTSIDE NETWORK | DENY |

FIG. 6

| # DOMAIN | USER | SERVER | ACCESS |
|---|---|---|---|
| ADMINISTRATOR | JOHN | ADMIN-DATABASE | ALLOW |
| DOCTOR | TOM | PATIENT-DATABASE | ALLOW |
| DOCTOR | TOM | ADMIN-DATABASE | DENY |
| NURSE | MARY | MEDICINE-DATABASE | ALLOW |

FIG. 7

CreateFile Event | "C:\Sage\A.txt", Read/Write Permission

WriteFile Event | "C:\Sage\A.txt", "Hello World"

DeleteFile Event | "C:\Sage\A.txt"

CopyFile Event | "C:\Sage\", "C:\SageServer\"

OpenRegistry Event | "HKCU\Sage\Client", Read/Write Permission

SetRegistryValue Event | "HKCU\Sage\Client\Language", "English"

CreateProcess Event | "C:\Sage\Bin\Accounts.exe", "Tom"

CreateService Event | "ServiceName - Payroll", "Bin Path - C:\Sage\Bin\Payroll"

FIG. 8

CreateFile Event | "C:\Program Files\ProcessTracker.exe", Read/Write/Execute Permission WriteFile Event | "C:\Program Files\Hosts.txt"

CopyFile Event | "\\UnrecognizdNetworkShare\Hacker\", "C:\AllUsers\Documents"

SetRegistryValue Event | "HKLM\Microsoft\SQLServer\AllowedUsers", "Mr.Stranger"

CreateProcess Event | "C:\Bin\PasswordExtractor.clk"

FIG. 9A

CreateFile Event | "C:\Program Files\ProcessTracker.exe", Read/Write/Execute -> BLOCKED WriteFile Event | "C:\Program Files\Hosts.txt" -> ALERT GENERATED CopyFile Event | "\\UnrecognizdShare\Hacker\", "C:\AllUsers\Documents" -> ALERT GENERATED SetRegistryValue Event | "HKLM\SQLServer\AllowedUsers", "Mr.Stranger" -> ALERT GENERATED CreateProcess Event | "C:\Bin\PasswordExtractor.clk" -> BLOCKED

FIG. 9B

```
CreateFile Event | "C:\Program Files\ProcessTracker.exe", Read/Write/Execute ->
ADMIN UNBLOCK [SAFE]

SetRegistryValue Event | "HKLM\SQLServer\AllowedUsers", "Mr.Stranger" ->
ADMIN ALLOW [SAFE]

CreateProcess Event | "C:\Bin\PasswordExtractor.clk" -> ADMIN BLOCKED
[UNSAFE]
```

FIG. 9C

| # FROM IP | FROM PORT | TO IP | TO PORT |
|---|---|---|---|
| 192.168.3.20 | 2001 | 200.110.203.5 | 8000 |
| OLD_STORE | 52001 | NEW_STORE | 9000 |
| 127.0.0.1 | 7000 | NEW_SERVER | 7000 |
| 100.100.100.1 | 2001 | 100.100.100.1 | 8000 |

FIG. 10

```
C:\Container1>cd C:\ProgramFiles\

ACCESS DENIED

C:\Container1>cd C:\Container2\

ACCESS DENIED

C:\Container1>dir C:\

ACCESS DENIED

C:\Container1>echo Test > C:\Container2\NewFile.txt

ACCESS DENIED

C:\Container1>cd C:\Container1\Folder1

C:\Container1\Folder1> echo Test > TestFile.txt

FILE CREATED SUCCESSFULLY
```

FIG. 11B

```
Container1. RegCreateKey("HKCU\SOFTWARE\NEWKEY")

ACCESS DENIED

Container1. RegOpenKey("HKCU\SOFTWARE\CONTAINER2\REG2")

ACCESS DENIED

Container1. RegCreateKey("HKCU\SOFTWARE\CONTAINER1\NEWREG1")

REGISTRY KEY CREATED SUCCESSFULLY

Container1. RegOpenKey("HKCU\SOFTWARE\CONTAINER1\NEWREG1")

REGISTRY KEY CREATED SUCCESSFULLY
```

FIG. 12B

```
Container1. Connect("CONTAINER2_SERVER:80")

ACCESS DENIED

Container1. Receive("Localhost:CONTAINER2_PORT", "Data1")

ACCESS DENIED

Container1. Connect("CONTAINER1_SERVER:80")

CONNECTION ESTABLISHED

Container1. Send("Localhost:CONTAINER1_PORT", "Data2")

DATA SENT
```

FIG. 13

```
Container1. ConnectNamedPipe ("CONTAINER2_PIPE")

ACCESS DENIED

Container1. WriteToPipe("CONTAINER2_PIPE", "Data1")

ACCESS DENIED

Container1. ConnectNamedPipe ("CONTAINER1_PIPE")

CONNECTION ESTABLISHED

Container1. ReadFromPipe("CONTAINER1_PIPE", &Buffer)

DATA RECEIVED
```

FIG. 14

```
Container1. OpenMutex ("CONTAINER2_MUTEX")

ACCESS DENIED

Container1. CreateSemaphore("CONTAINER2_SEM")

ACCESS DENIED

Container1. CreateSemaphore ("CONTAINER1_SEM")

SEMAPHORE CREATED CONTAINER1_SEM

Container1. OpenMutex("CONTAINER1_MUTEX")

MUTEX OPENED WITH HANDLE 0X10
```

FIG. 15

Container1. CreateSemaphore("CONTAINER2_SEM")

"CONTAINER2_SEM" VIRTUALIZATION RULE FOUND

SEMAPHORE CREATED "CONTAINER2_SEM_1100"

FIG. 16

Container1. CreateProcess("CONTAINER2_PROCESS2")

ACCESS DENIED

Container1. CreateProcessInternalW ("CMD")

ACCESS DENIED

Container1. CreateProcess ("CONTAINER1_PROCESS1")

PROCESS CREATED

Container1. CreateProcess ("WHITELISTED_PROCESS")

PROCESS CREATED

FIG. 17

METHOD AND SYSTEM FOR APPLICATION VIRTUALIZATION THAT INCLUDES RESOURCE ACCESS CONTROL

CROSS-REFERENCE TO RELATED CASE

This application is entitled to the benefit of provisional U.S. Patent Application Ser. No. 62/454,002, filed Feb. 2, 2017, which is incorporated by reference herein. This application is a Continuation-in-part of U.S. application Ser. No. 15/392,965, filed Dec. 28, 2016, which is entitled to the benefit of provisional U.S. Patent Application Ser. No. 62/359,507, filed Jul. 7, 2016, both of which are incorporated by reference herein. This application is a Continuation-in-part of U.S. application Ser. No. 15/355,857, filed Nov. 18, 2016, which is incorporated by reference herein.

FIELD OF THE INVENTION

The invention relates generally to application virtualization.

BACKGROUND

In traditional enterprise environments, desktop software applications, such as productivity tools and database management tools, have been installed on local machines and run natively on the local machines. In client-server environments, software clients can run client-server based applications in which a database is stored on a server. More recently, traditional desktop applications have been "virtualized" such that "virtualized applications" can be run at a local machine or a server with less dependency on the specific configuration (e.g., operating system version) of the local machine or the server. Application virtualization is a technique in which an application is decoupled from the underlying operating system of the local machine on which the application executes. Various techniques for application virtualization are known in the field. Although application virtualization enables applications to run on local machines with different operating system configurations, different techniques for application virtualization offer different benefits.

SUMMARY

A method for executing a virtualized application on a computing system that includes a user-space and a kernel-space is disclosed. The method includes executing an application in the user-space, executing a user-level virtualization layer in the user-space, the user-level virtualization layer including a set of rules, performing, via the user-level virtualization layer, user-level hooking of events that are generated by the executing application according to the set of rules to identify events of interest, and determining whether to allow or block a function corresponding to an event that is identified as an event of interest based on the set of rules in the user-level virtualization layer.

In an embodiment, determining whether to allow or block a function corresponding to an event that is identified as an event of interest based on the set of rules in the user-level virtualization layer involves extracting at least one of an internet protocol address, a hostname, and a port number from the event and comparing the extracted at least one of an internet protocol address, a hostname, and a port number to a list to determine if the at least one of an internet protocol address, a hostname, and a port number is on the list.

In an embodiment, the method involves blocking a communication function based on an internet protocol (IP) address corresponding to an event that was identified as an event of interest.

In an embodiment, the method involves blocking a communication function based on a hostname corresponding to an event that was identified as an event of interest.

In an embodiment, the method involves blocking a communication function that corresponds to an event that was identified as an event of interest if the function relates to a socket call.

In an embodiment of the method, determining whether to allow or block a function corresponding to an event that is identified as an event of interest based on the set of rules in the user-level virtualization layer involves determining if the event is found in a training set and blocking the function corresponding to the event if the event is not found in the training set.

In an embodiment of the method, determining whether to allow or block a function corresponding to an event that is identified as an event of interest based on the set of rules in the user-level virtualization layer involves determining if the event is found on a black list and blocking the function corresponding to the event if the event is found on the black list.

In an embodiment of the method, determining whether to allow or block a function corresponding to an event that is identified as an event of interest based on the set of rules in the user-level virtualization layer involves determining if the function relates to a resource that is outside of a pre-established location.

In an embodiment, the method involves blocking the function corresponding to an event if the function relates to a resource that is outside of the pre-established location.

In an embodiment, the method involves blocking the function corresponding to an event if the function relates to a resource that is outside of the pre-established location unless the function corresponds to a resource that is on an allowed list.

In an embodiment, the method involves storing events that are identified as events of interest in a database, applying a pattern recognition process to the events that are stored in the database, generating a rule for the set of rules in the user-level virtualization layer based on the pattern recognition process, and applying the generated rule through the user-level virtualization layer.

In an embodiment of the method, generating a rule for the set of rules in the user-level virtualization layer based on the pattern recognition process involves updating an existing rule.

In an embodiment of the method, generating a rule for the set of rules in the user-level virtualization layer based on the pattern recognition process involves generating a new rule.

A system for running an application via an operating system executing on a computing device is discloses. The system includes at least one processing unit and memory, an operating system stored on the memory, an application stored on the memory, and a user-level application virtualization layer stored on the memory. Execution of the application and the user-level application virtualization layer on the operating system involves executing the application in user-space, executing the user-level virtualization layer in the user-space, the user-level virtualization layer including a set of rules, performing, via the user-level virtualization layer, user-level hooking of events that are generated by the executing application according to the set of rules to identify events of interest, and determining whether to allow or block a function corresponding to an event that is identified as an event of interest based on the set of rules in the user-level virtualization layer.

A non-transitory computer readable medium that stores computer-executable code is disclosed. The computer-executable code includes an application and a user-level virtualization layer. The application and user-level virtualization layer including computer-executable code, which when executed by one or more processors performs executing the application in user-space, executing the user-level virtualization layer in the user-space, the user-level virtualization layer including a set of rules, performing, via the user-level virtualization layer, user-level hooking of events that are generated by the executing application according to the set of rules to identify events of interest, and determining whether to allow or block a function corresponding to an event that is identified as an event of interest based on the set of rules in the user-level virtualization layer.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 6 illustrates a set of action rules that may be enforced by an action engine of the user-space virtualization layer to implement a micro-firewall feature.

FIG. 7 illustrates a set of action rules that may be enforced by the action engine of the user-space virtualization layer to implement a micro-firewall for an SQL server application.

FIG. 8 is an example of data collected during a training operation.

FIG. 9A is an example of monitored events that appear to be suspicious activity.

FIG. 9B illustrates that certain operations corresponding to the monitored events of FIG. 9A have been blocked or that alerts have been generated in response to certain monitored events but the corresponding operations are not necessarily blocked.

FIG. 9C illustrates administrator actions that are taken on some of the monitored events shown in FIGS. 9A and 9B.

FIG. 10 illustrates an example of a rule set to implement a micro-gateway using user-level API hooking.

FIG. 11B depicts example file system API calls made by application A in container 1 and corresponding actions that illustrate a sandboxed file system.

FIG. 12B depicts example registry API calls made by application A in container 1 and corresponding actions that illustrate a sandboxed registry system.

FIG. 13 depicts example network access API calls made by application A in container 1 and corresponding actions that illustrate sandboxed network access.

FIG. 14 depicts example IPC API calls made by application A in container 1 and corresponding actions that illustrate sandboxed inter process communication.

FIG. 15 depicts example kernel object API calls made by application A in container 1 and corresponding actions that illustrate sandboxed kernel objects.

FIG. 16 depicts an example kernel object API call made by application A in container 1 and corresponding actions that illustrate a virtualized kernel object.

FIG. 17 depicts example process API calls made by application A in container 1 and corresponding actions that illustrate a sandboxed process.

Throughout the description, similar reference numbers may be used to identify similar elements. Additionally, in some cases, reference numbers are not repeated in each figure in order to preserve the clarity and avoid cluttering of the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
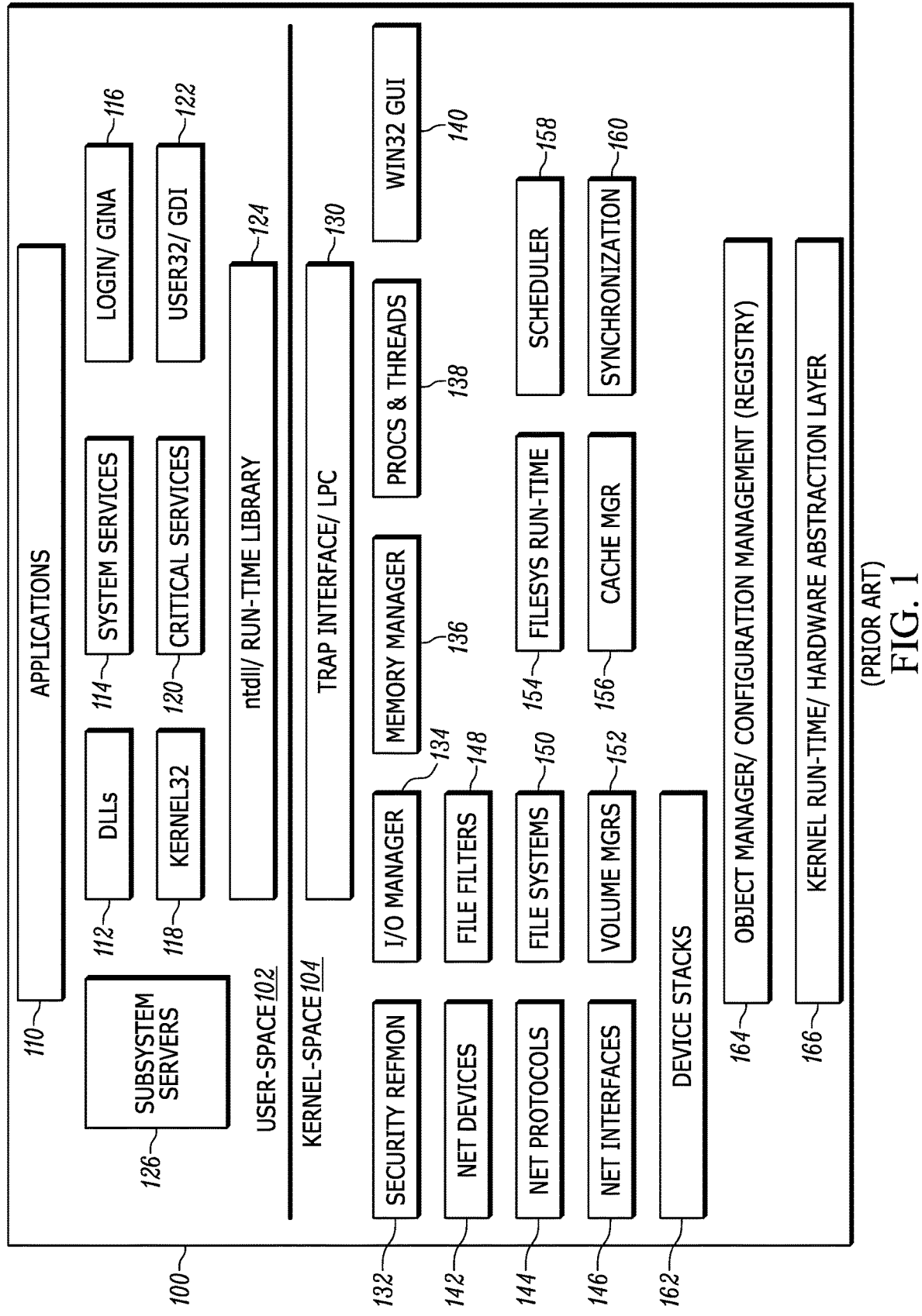
FIG. 1 depicts an example embodiment of an operating system architecture, in particular, a WINDOWS operating system architecture that executes on a client device.

FIG. 1 depicts an example embodiment of an operating system architecture 100, in particular, a WINDOWS operating system architecture that executes on a client device. As shown in FIG. 1 and as is well known in the field, the operating system architecture is divided into a user-space 102 and a kernel-space 104, also referred to as the "user-level" and "kernel-level," respectively. In the embodiment of FIG. 1, components in the user-space include applications 110, dynamic link libraries (DLLs) 112, system services 114, login/graphical identification and authentication (GINA) 116, kernel32 118, critical services 120, user32/graphical device interface (GDI) 122, ntdll (NT layer DLL)/run-time library 124, and subsystem servers 126. Such components of an operating system are known in the field and thus may not be described in further detail herein. In the embodiment of FIG. 1, components in the kernel-space include trap interface/local procedure call (LPC) 130, security refmon (reference monitor) 132, I/O manager 134, memory manager 136, processes and threads 138, win32 graphical user interface (GUI) 140, Net devices 142, Net protocols 144, Net Interfaces 146, file filters 148, file systems 150, volume managers 152, filesys run-time 154, cache manager 156, scheduler 158, synchronization 160, device stacks 162, an object manager/configuration management (registry) 164, and kernel run-time/hardware abstraction layer 166. Such components of an operating system are known in the field and thus may not be described in further detail herein. Although not shown in FIG. 1, the WINDOWS architecture executes on hardware, for example, hardware fully contained on a personal computing device such as a desktop computer, a laptop computer, etc or hardware on a server or hardware distributed across multiple servers. As is known in the field, the hardware may include memory (e.g., ROM, RAM, and persistent memory such as a hard disk and/or FLASH memory) and at least one central processing unit. Although the operating system architecture of FIG. 1 is provided as an example, the below-described techniques are applicable to operating system architectures with different configurations and/or with more or less components than those shown in FIG. 1.

Applications executed in an operating system architecture include office productivity applications such as word processors, spreadsheets, and presentation applications, application plug-ins, communications applications such as web browsers, and a multitude of enterprise applications, e.g., accounting, personnel management, sales, product management, project management, etc. In an embodiment, applications may work in tandem with each other. In another embodiment, an application may be formed by a combination of applications that work in tandem with each other. For example, a web browser plug-in may work in tandem with a web browser and the combination of the web browser plug-in and the web browser is referred to as an application. As mentioned above, traditional desktop applications have been "virtualized" such that "virtualized applications" can be run at a local machine with less dependency on the specific configuration (e.g., operating system version) of the local machine. Application virtualization is a technique in which an application is decoupled from the underlying operating system of the local machine on which the application executes. Various techniques for application virtualization are known in the field. In general, a "virtualized application" or "application virtualization" involves techniques that decouple applications from the underlying operating system of the client device. In an embodiment, decoupling applications from the underlying operating system of the client device involves separating, dividing, insulating, and/or protecting the operating system from the virtualized application. For example, an application is virtualized so that when the application is installed on a client device, the application does not write or dilute the operating system files or registries and/or does not corrupt the operating system itself. In an embodiment, an application virtualization layer creates a "sandbox," which is an insulated environment on the client device. For example, a "sandbox" may include controls that limit access by the application to resources such as files, registries, certain hardware, and/or certain other applications. Application virtualization can utilize user-space/user-mode (referred to herein as "user-space") virtualization techniques and/or kernel-space/kernel-mode (referred to herein as "kernel-space") virtualization techniques. In an embodiment, user-space virtualization can be implemented without needing administrative rights to access certain resources, such as certain files/registries. In an embodiment, a virtualized application is not installed on the client device in a conventional manner in that in a convention installation the application declares, while installing on the operating system, that the application is installing and hence the operating system is aware that something was installed. Additionally, in a conventional installation, the application writes specific files/registries in the installation areas of the registry (e.g., protected areas of the memory that require admin rights to access) to make the operating system aware of the application. On the other hand, in an embodiment, a virtualized application does not declare to the operating system that the application is installing. Therefore, the operating system does not necessarily know that an application was installed at least because the application writes all the files and registries used by the application to run in a virtualized file system and a virtualized registry area. In an embodiment, a virtualized file system and virtualized registry are files and registries that are created in a separate location (e.g., a separate namespace) other than the operating system's default location. Locating such files in a separate location (e.g., in a separate namespace) is a technique used to sandbox, or "containerize," the files and/or registries used by the application. Using the virtualized file system and virtualized registry, the operations triggered by the application will be performed on the virtual files and/or registries to prevent the application from reading/writing to the system folders and registries of the operating system. For example, an application might require its files to be in "c:\ProgramFiles\ApplicationVendor\ApplicationName." In an embodiment, these files are virtualized so that when the application looks for files in "c:\Program Files\ApplicationVendor\ApplicationName" the file system API calls are redirected to "c:\Sandbox\Program Files\ApplicationVendor\ApplicationName."

An application that is installed in a conventional matter is often referred to as a "native" application whereas an application installed using a virtualized file system and a virtualized registry area is referred to as a "virtualized application." In an embodiment, execution of a virtualized application at run-time is controlled by the application virtualization layer. In an embodiment, a virtualized application appears to a user to interface directly with the client device's operating system, but the virtualized application interfaces with the application virtualization layer. In an embodiment, the application virtualization layer intercepts or "hooks," communications between the application and the operating system and acts as a proxy between the application and the native system registries and system files of the operating system running on the client device. In an embodiment, the application virtualization layer can implement virtual registry files and secure file stores within the sandbox.

Techniques for application virtualization can be broadly categorized as "agent-less" or "user-space" application virtualization or "agent-based" or "kernel-space" application virtualization. While creating a virtual application package, the application and client components are compiled and stored in one single package or container, for example, a single executable. Such virtualized applications are fully encapsulated and able to run as a standalone executable from multiple locations such as a network drive, local drive, or USB removable storage device. In an embodiment, every instance of a virtualized application contains a "built-in" agent. Therefore, no agent, or client-component, is installed in the operating system of the local machine but the virtualized application has an agent that is used at run-time.

On the other hand, client-based, or agent-based, application virtualization involves the use of a locally installed agent or client, wherein the agent is "installed" in the kernel-space on the local machine in a conventional sense such that the operating system is aware that the agent is locally installed. Such a locally installed agent, or virtualization engine, contains functionality to set up and maintain a virtual environment for each virtualized application. The locally installed agent implements management tasks such as File Type Association (FTA) registration and shortcut creation, which are important functions of agent-based application virtualization solutions such as App-V.

The WINDOWS operating system runs all code, applications, and services, in one of two modes, user-mode (user-space) and kernel-mode (kernel-space). As is known in the field, the two modes utilize two different security/access models. Code running in kernel-space has full operating system access. Kernel-space functions typically come from device drivers and from the WINDOWS kernel itself. A kernel-space driver or service is part of a locally installed agent on the local machine. Problems when executing code in kernel-space can quickly lead to complete system halts (e.g., the Blue Screen Of Death). Kernel-space drivers need admin privileges to be initially installed while user-space agents do not need admin privileges. Code running in user-space does not have full operating system access and there is no direct interaction with the kernel of the operating system running on the local machine.

Figure 2:
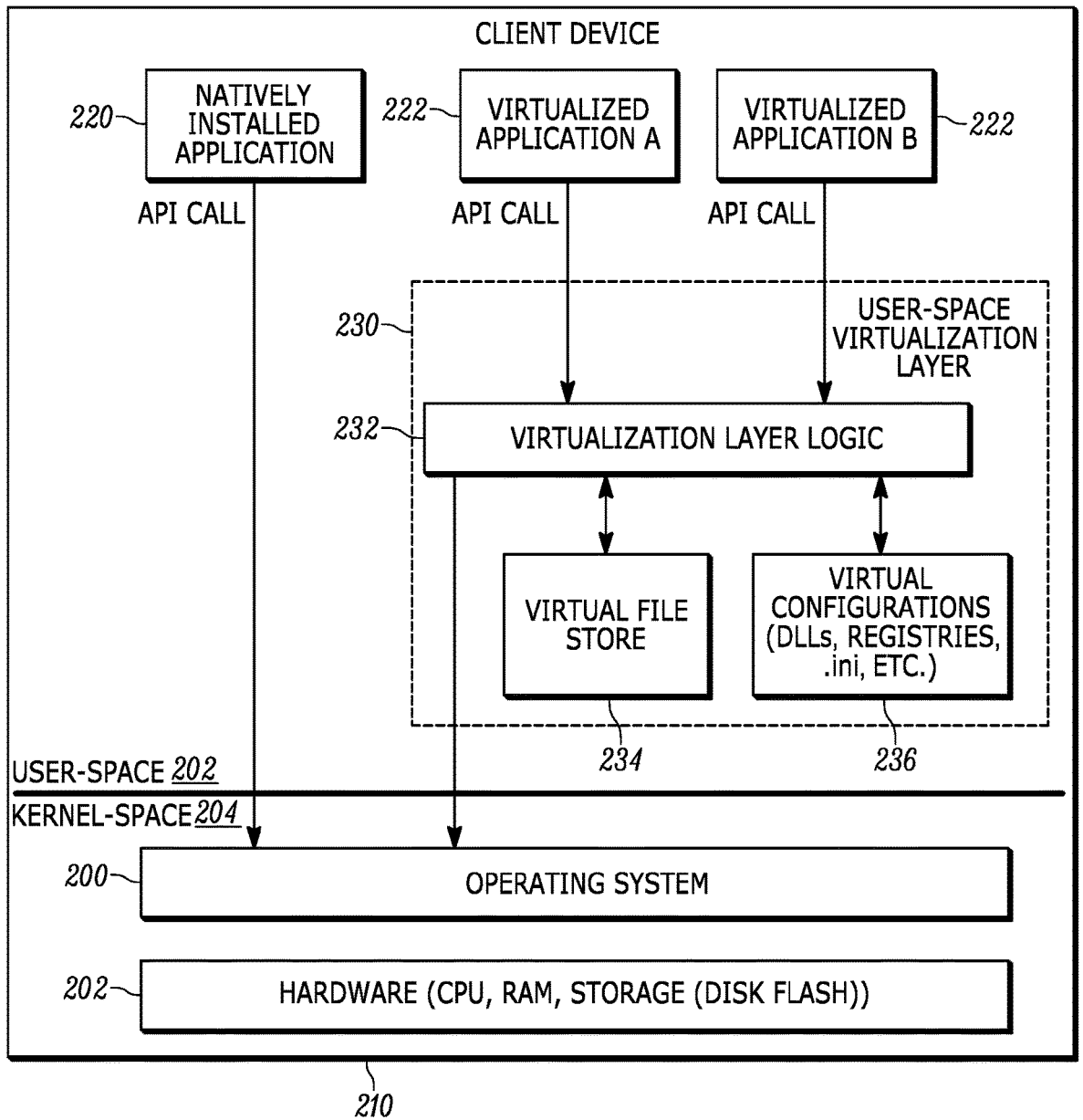
FIG. 2 illustrates the interaction of an operating system with both natively installed applications and virtualized applications.

FIG. 2 depicts a client device 210 having an operating system 200 and hardware 202. FIG. 2 illustrates the user-space 202, the kernel-space 204, and the interaction of the operating system with both a natively installed application 220 and virtualized applications 222, application A and application B. As illustrated in FIG. 2, natively installed applications interact directly with the operating system and the virtualized applications interact with a user-space application virtualization layer 230 that includes virtualization layer logic 232, a virtual file store 234, and virtual configurations (e.g., DLLs, registry, .ini, etc., and other configurations rules as will be described in more detail below) 236. As illustrated in FIG. 2, API calls generated from the natively installed application interact directly with the operating system, however, API calls generated from the virtualized applications are intercepted or "hooked," by the user-space virtualization layer. The user-space virtualization layer virtualizes the intercepted API calls and passes the virtualized API calls to the operating system in the kernel-space for execution. In an embodiment, virtualizing an API call involves redirecting an aspect of the API call, such as a DLL path and/or a file path to the virtual file store and/or to the virtual configurations (e.g., DLLs, registry, .ini, etc.). In an embodiment as illustrated in FIG. 2, the user-space virtualization layer operates exclusively in the user-space.

A user-space virtualization layer may be implemented through a set of components (e.g., files) that, when executed, constitute the user-space virtualization layer. Virtualized applications may be organized and stored as a "package" or "container," which includes a set or bundle of files that are used to run the virtualized application. In an embodiment, application packages or application containers can be stored on a virtualized application portal for access by the client devices.

In an embodiment, files packaged within the container/sandbox of a user-space virtualization layer are selected to make sure that the files are compatible with the requirements of the application being virtualized. For example, an application running on WINDOWS XP (WinXP) needs DLLs available on WinXP. The application might fail to run on WINDOWS 10 (Win10) as the DLLs on Win10 are different from that of WinXP. Application virtualization fixes such operating system compatibility issues by packaging the DLLs from WinXP as part of the virtual configuration files so that the application accesses WinXP DLLs even if the client device is running Win10 as the operating system.

Figure 3:
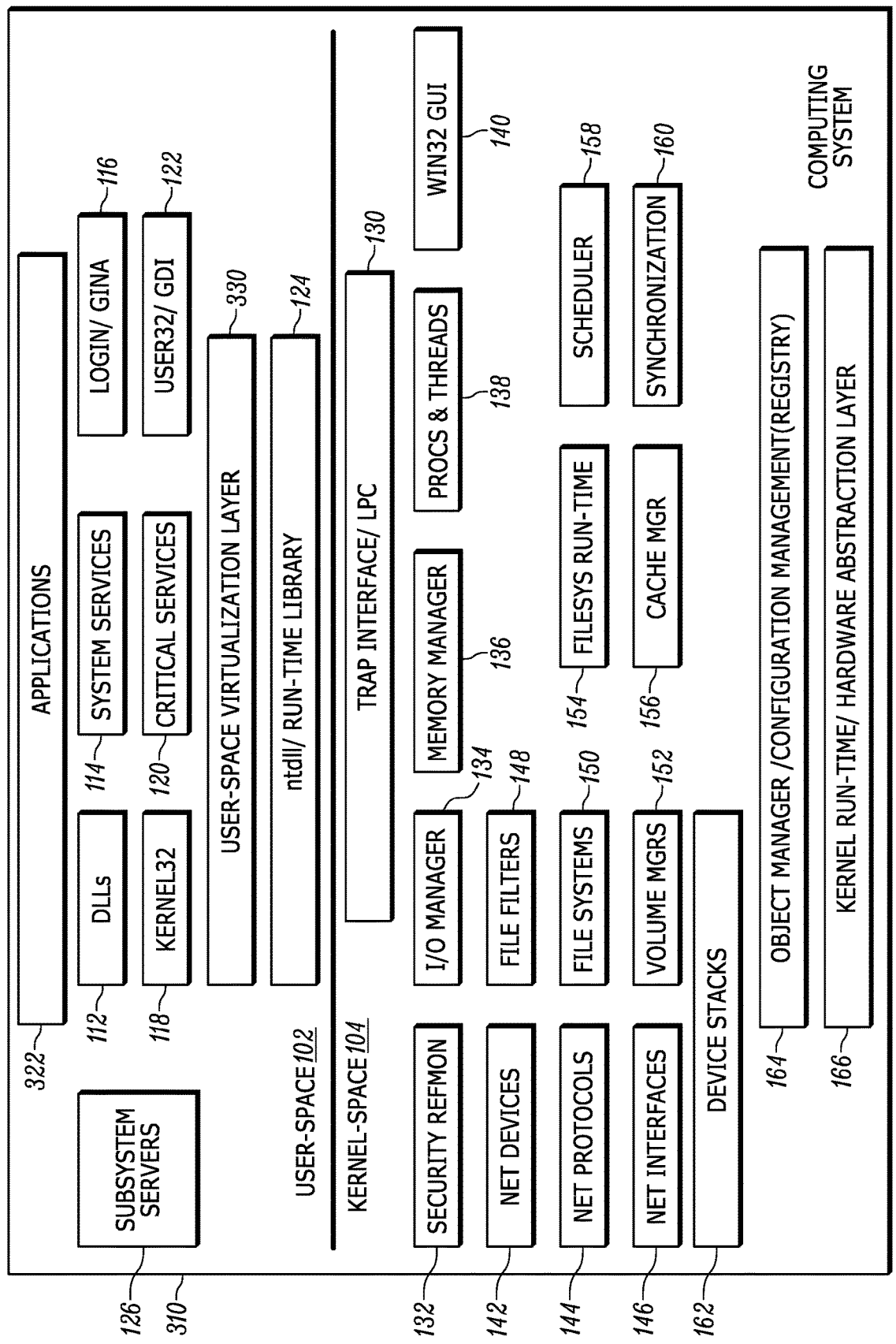
FIG. 3 illustrates a user-space virtualization layer in the user-space of a computing system that is similar to the computing system shown in FIG. 1.

In an embodiment, the user-space virtualization layer 230 includes computer executable instructions and data, which when executed, virtualize API calls from the application to effectively virtualize an application. The virtual file store 234 stores files that are within the namespace that includes the sandbox created by the user-space virtualization layer. The files stored in the virtual file store may include any data associated with the application. In an embodiment, the virtual file store uses a namespace that is specific to the user-space virtualization layer and that can be accessed without admin rights. The virtual configurations 236 stores files such as DLLs, registries, and .ini files used to virtualize the application. The virtual configuration files may include DLLs, registries, .ini files. The user-space virtualization layer logic intercepts (or hooks) and interprets the API calls and interacts according to a set of layer-specific virtualization rules with the virtual file store and the virtual configurations to generate virtualized API calls. In an embodiment, the user-space virtualization layer logic and virtual configurations apply redirection rules and act as a redirection engine (also referred to as a "hooking engine") that is specific to the user-space virtualization layer. The operating system 200 illustrated in FIG. 2 may be an operating system such as the WINDOWS operating system, which is described above. Alternatively, the operating system may be an operating system other than the WINDOWS operating system, such as, for example, the APPLE OS X operating system and Unix-like operating systems. FIG. 3 illustrates a user-space virtualization layer 330 in the user-space 102 of a computing system 310 that is similar to the computing system 100 shown in FIG. 1.

As described above, the user-space virtualization layer (also referred to as a "virtualization engine" or a "virtualizer") is a user-space engine that intercepts or hooks into APIs at the NTDLL level (before the API reaches kernel) when a process (e.g., an application) is running on an end-user's machine or on some other computing system. Example APIs that may be hooked at the user level include filesystem APIs, registry APIs, socket APIs, inter process communication APIs, database APIs, and web APIs. Hooking into these APIs at the user-level gives the user-space virtualization layer a chance to take control of the calls before they reach the kernel drivers at the kernel-level. The user-space virtualization layer can monitor all such calls and may take some action, such as record, allow, block, modify, and/or redirect the paths based on rules in the virtual configuration or send information as a notification to an additional module, such as a machine learning engine.

Various features that can be implemented through user-level API hooking include:

1) Saving state of the application as described in U.S. patent application Ser. No. 15/355,857, filed on Nov. 18, 2016, the contents of which is included herein.

2) Improving security at the application level to allow/disallow certain operations like network/database/filesystem access etc. Improving security at the application level can be done on a per-user per-application basis without admin rights. For example: light weight, application level security components such as a micro-firewall, micro-name server, a micro-antivirus feature, web browser security, etc., which could be applied on specific applications.

3) Monitoring an application's runtime activity to detect suspicious activity performed by the application (e.g., as done by malware). In an embodiment, the activity monitoring may be based on machine learning patterns generated in the past and report/block operations which might potentially cause a security threat or system/data corruption and suspicious activities may be reported/blocked before reaching the kernel-level. For example: this feature can be used as a light weight, micro-antivirus feature that is built-in to the application, which can help to isolate untrusted applications or software infected by malware. The feature can also be used to generate alerts if an application performs excessive access violations and such operations can be blocked from reaching the kernel-level to prevent damage.

4) Making applications more secure by correcting bad programming practices while keeping the application's functionality intact; without any code changes. For example: converting unsecure/deprecated API calls triggered from an application into secure calls (e.g., without code changes), imposing secure communication by enabling encryption before sending packets over a network, handling programming bad practices like system-wide mutex, global WINDOWS hooks etc., and converting the API calls into safer API calls.

5) Improving performance of an application by predicting data access operations (e.g., by pre-fetching required resources such as remote files, etc.).

6) Performing web/network/database/storage related predictions for unavailability/errors before an application encounters a failure scenario and prevent the scenario from taking place or self-heal an error.

In an embodiment, executing a virtualized application involves "machine learning-based rules setting" and/or a "machine learning-based rules engine." In an embodiment, "machine learning-based rules setting" and/or a "machine learning-based rules engine" involves user-level hooking of API calls (also referred to as "events") and then: a) identifying what events to record, b) adding those events to a database(s), c) applying some pattern recognition process to the recorded events (various different techniques of pattern recognition may be applied), d) establishing/updating rules based on the pattern recognition, and e) applying the rules using a user-space application virtualization technique.

In accordance with an embodiment of the invention, a technique for executing a virtualized application involves during execution of the virtualized application, evaluating, in an application virtualization layer, events that are generated during execution of the application to identify events of interest and then taking some action based on an identified event of interest. The action may be an action that is triggered by a pre-programmed set of rules and/or the action may be an action that is taken in response to a rule that is learned via machine learning. The action or actions that are taken may be used to implement a feature such as at least one of the features described herein.

User-Level API Hooking with Machine Learning

Application virtualization techniques as disclosed herein are techniques to virtualize an application (e.g., whether the application is natively installed or containerized) and to control the application's interactions with the environment (e.g., with other applications and/or with the operating system). The techniques may include pre-programmed rules and/or machine learning techniques to implement various features. As described above, a user-space virtualization layer (also referred to as a virtualization engine or a virtualizer) may include a "redirection engine" or a "hooking engine" configured to hook into user-space APIs before the calls reach the kernel level. The user-space virtualization layer can track a sequence of events triggered by the application at runtime (e.g., on an end-user system) to identify application interaction patterns including, for example, data access patterns (e.g., file/registry operations), inter-process communication patterns, networking/socket operations, web access/queries, database interactions, etc. Such patterns can form a rich set of knowledge base for a machine learning engine to predict a future sequence of operations based on the past events learned and to make control decisions based on the prediction. User-level API hooking with machine learning can be implemented in different ways to influence applications on a per-user and/or a per-application basis.

In an embodiment, machine learning is implemented within the user-space virtualization layer to track, detect, modify, allow, and/or block an application's interaction with other applications/operating systems at runtime and to store event data and identify patterns that can be analyzed to improve security, performance, storage, resource unavailability, etc. In an embodiment, executing a virtualized application involves "machine learning-based rules setting" and/or a "machine learning-based rules engine." In an embodiment, "machine learning-based rules setting" and/or a "machine learning-based rules engine" involves user-level hooking of API calls (also referred to as "events") and then: a) identifying what events to record, b) adding those events to a database(s), c) applying some pattern recognition process to the recorded events (various different techniques of pattern recognition may be applied), d) establishing/updating rules based on the pattern recognition, and e) applying the rules using a user-space application virtualization technique.

In an embodiment, the user-space virtualization layer is configured to monitor events (e.g., via user-level API hooking), store event data, and to identify patterns (e.g., through machine learning) based on the application's activities at runtime and to virtualize the API calls to impose actions (like redirection, file synchronization, blocking restricted/suspicious operations, etc.). In an embodiment, the user-space virtualization layer may act as a debugger to the application to gain full control of the application.

The user-space virtualization layer could be deployed on server-less or stateless cloud computing environments, including but not limited to desktop systems, an IaaS (Infrastructure as a service) environment, physical or virtual disks, a stateless pool of servers, Remote Desktop Service (RDS) pools, a server-less computing architecture, system volumes, application layering disks, etc. In an embodiment, a computing platform is "stateless" in that state information generated during execution of a containerized application is not saved in the memory of the stateless computing platform once the application is closed, e.g., the state information does not "persist" in the stateless computing platform after execution of the application is ended. In an embodiment, a machine learning algorithm monitors, records, and controls an application's operations at runtime. Such a machine learning algorithm can be implemented within the user-space virtualization layer to detect interesting calls triggered by the application at runtime, learn and save such API calls in memory, and predict future operations and program a set of rules to perform actions based on the API calls, thereby, controlling an application's interaction with other applications and/or the local operating system.

In an embodiment, the user-space virtualization layer is invoked as a separate application in the user-space. The user-space virtualization layer then spawns the target application and hooks into the target application to track its activities. Such a technique could be used for locally installed applications and the technique does not require operating system admin rights.

In an embodiment, the user-space virtualization layer is provided as an element of a containerized application. With containerized applications, the user-space virtualization layer is packaged within a container and deployed when the containerized application gets launched. Such a technique could be used for applications deployed from on-premise or cloud platforms and does not need operating system admin rights. An example of such an implementation is described in U.S. patent application Ser. No. 15/355,857, filed on Nov. 18, 2016, entitled "METHOD AND SYSTEM FOR EXECUTING A CONTAINERIZED STATEFUL APPLICATION ON A STATELESS COMPUTING PLATFORM USING MACHINE LEARNING."

In an embodiment, DLL injection could be used to inject a user-space virtualization layer in the form of a DLL (e.g., virtualization engine (VE) VE.DLL) into the target application. The user-space virtualization layer DLL then runs a virtualization layer ".exe" file from its DLLMain. The user-space virtualization layer then attaches itself as a debugger to the target application and starts tracking the activities of the target application as the target application executes. Various DLL injection mechanisms could be used to inject the user-space virtualization layer DLL (e.g., VE.DLL) into a process. Such a technique may or may not need admin rights depending on the DLL injection mechanism used.

Figure 4:
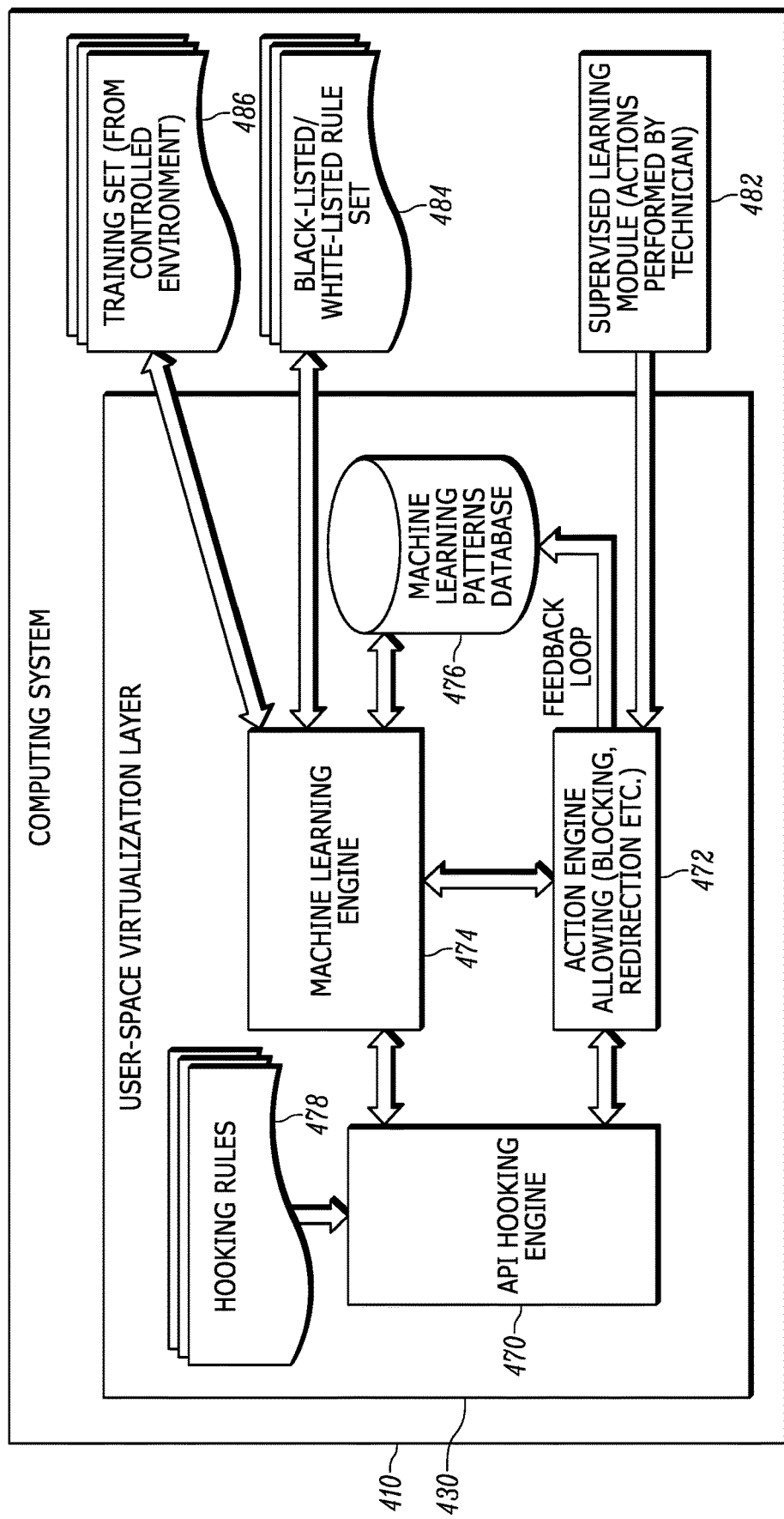
FIG. 4 depicts a functional block diagram of an embodiment of a user-space virtualization layer that is configured to implement user-level API hooking with machine learning.

In an example operation, a user launches an application (whether it is locally installed or containerized) on a server/desktop computer, which could be hosted on server-less computing infrastructure, cloud infrastructure, pool of stateless servers, RDS, physical/virtual disks, application layering disks, IaaS infrastructure, etc. The user-space virtualization layer takes control of the application using one of the above-described deployment techniques and acts as a debugger on the end-user system. The user-space virtualization layer is responsible for virtualizing all the APIs needed for taking actions to implement a feature, including pattern generation, recording operations, and redirecting/allowing/blocking calls made by the application depending on the virtualizer's configuration file. In an embodiment, blocking an API call at the user-level virtualization layer involves preventing the API call from being processed by elements of the operating system that function at the kernel-level of the operating system. Likewise, allowing an API call at the user-level virtualization layer involves allowing the API call to be processed by elements of the operating system that function at the kernel-level of the operating system In an embodiment, the user-space virtualization layer operates between an application in the user-space and functions of the operating system that operate in the kernel-space (including the kernel-level drivers). FIG. 4 depicts a functional block diagram of an embodiment of a computing system 410 that includes a user-space virtualization layer 430 configured to implement user-level API hooking (e.g., to implement event monitoring) with machine learning. In the embodiment of FIG. 4, the user-space virtualization layer includes an API hooking engine 470, an action engine 472, a machine learning engine 474, a machine learning patterns database 476, and hooking rules 478. In operation, the API hooking engine hooks into API calls generated by the executing application according to a set of hooking rules. Once an API call is hooked, some action can be taken by the action engine according to a set of action rules that is maintained by the action engine. Actions may include redirection of operations related to the API call (e.g., user-space application virtualization), allowing or blocking of some action, generating a notification/alert, and/or some other action. The action engine may also pass certain API calls (or API related information) to the machine learning patterns database for recording/storage. The machine learning engine may access the machine learning patterns database to identify and/or evaluate patterns to perform operations such as rule setting based on recognized patterns. The user-space virtualization layer may also receive input from a supervised learning module 482, from black-listed and/or white-listed rule sets 484 (e.g., where a "black list" is an exclusion list and a "white list" is an inclusion list), and/or from a training set 486 (e.g., which is generated in a controlled environment). Various features as will be explained below can be implemented using user-level API hooking with machine learning.

Figure 5A:
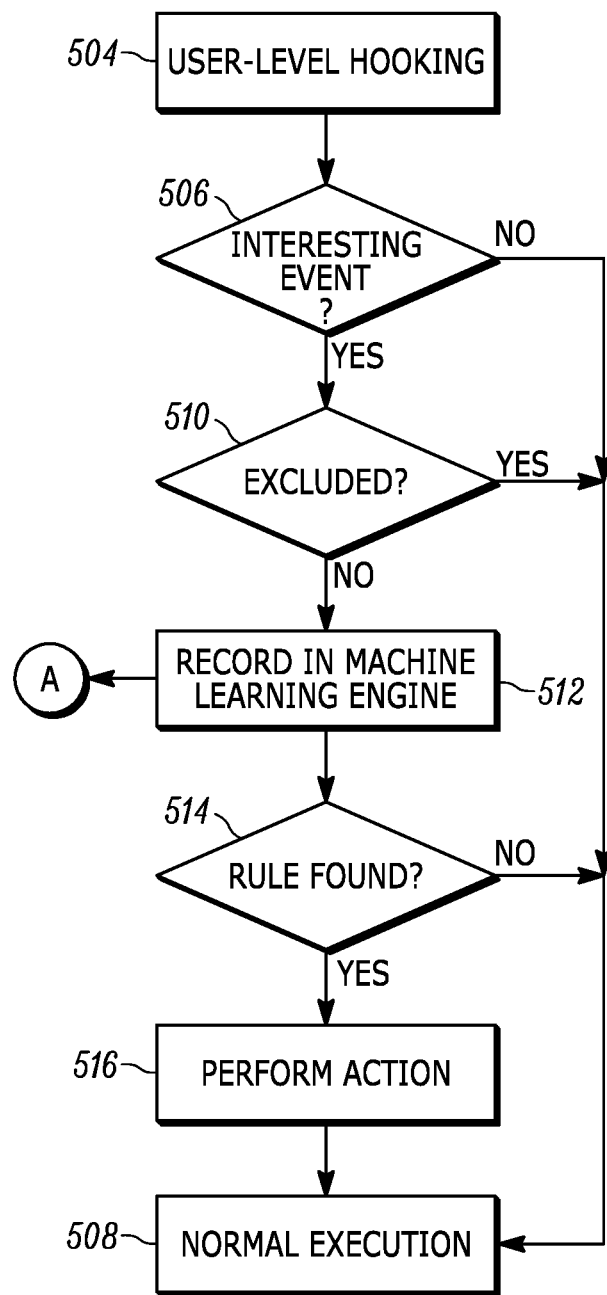
FIGS. 5A and 5B depict a process flow diagram for implementing user-level API hooking with machine learning.
Figure 5B:
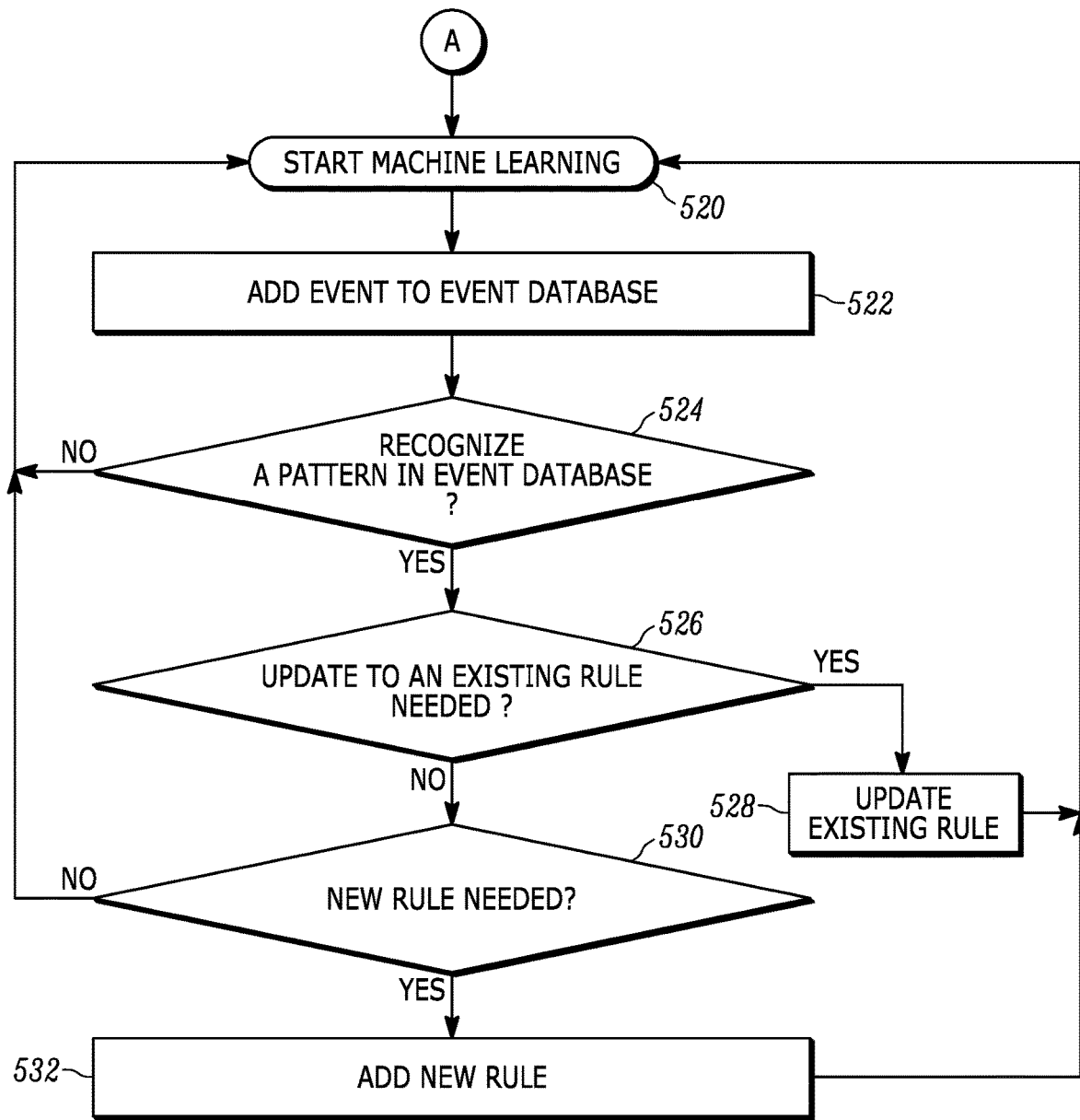

FIGS. 5A and 5B depict a process flow diagram for implementing user-level API hooking with machine learning. At block 504, the hooking engine hooks API calls (e.g., events) from an executing application. In an embodiment, the API hooking engine hooks WINDOWS APIs at the NT level (e.g., NtFileCreate, NtFileWrite, etc.) by adding a JUMP instruction at the start of the operating system function that jumps the process to a virtualized function (e.g., a function or "function handler" within the virtual configurations (FIG. 2, element 236). Thus, when an application calls a function such as NtCreateFile or NtReadFile, the program execution will jump to the virtualized function handlers, executing code corresponding to the virtualized function handlers. At decision point 506, it is determined if a particular event is an interesting event, e.g., the event should be included in the data for machine learning. Examples of events that may be considered interesting and that may be considered in machine learning activity include: filesystem APIs; registry APIs; socket APIs; inter process communication APIs; database APIs; and web APIs. If an event is not considered interesting, the process proceeds to normal execution at block 508, e.g., normal execution of the API call. If the event is considered interesting, the process proceeds to decision block 510, and it is determined if the event is excluded from the machine learning process. For example, the decision may involve comparing the event to an exclusion list that identifies certain predefined events that are not of interest for machine learning. If the event is determined to be excluded, the process proceeds to normal execution at block 508, e.g., normal execution of the API call. If the event is not excluded, the process proceeds to block 512 and the event is recorded in the machine learning patterns database. Operations related to the machine learning engine are described in more detail with reference to FIG. 5B. Once the event is recorded in the machine learning patterns database, the process proceeds to decision point 514. At decision point 514, it is determined if a rule is found that corresponds to the event. For example, the event may be used as the key to search a set of rules to determine if there is a rule that corresponds to the event. If no rule is found to correspond to the event, the process proceeds to normal execution at block 508, e.g., normal execution of the API call. If a rule is found to correspond to the event, then the process proceeds to block 516 and an action associated with the rule is performed. For example, the action may include an operation related to the API call, e.g., redirection, allowing/blocking of some action, generating a notification/alert, and/or some other action. Depending on the action taken, the process may also proceed to normal operation at block 508, e.g., normal execution of the API call.

Referring now to FIG. 5B. At block 520, a machine learning operation is started. For example, a machine learning operation is started in response to receiving an interesting event at the machine learning database. At block 522, the event identified in FIG. 5A is added to an event database. At decision point 524, it is determined if a pattern is recognized in the event database. For example, pattern recognition rules and/or pattern recognition algorithms are applied to the event database to see if any patterns are recognized. Examples of event patterns that may be of interest are described below. If a pattern is not recognized in the event database, then the process returns to block 520. If a pattern is recognized in the event database, then the process proceeds to decision point 526. At decision point 526, it is determined if an update to an existing rule is needed in response to the recognized pattern. For example, recognition of a pattern in the event database may indicate that an existing rule needs to be updated. Examples of such rules are described below. If an update to an existing rule is needed, the process proceeds to block 528 and the existing rule is updated. For example, the set of rules that is used by the action engine 472 (FIG. 4) and/or in the process steps 514 and 516 in FIG. 5A to determine an action to perform is updated. If it is determined that an update to an existing rule is not needed, then the process proceeds to decision point 530. At decision point 530, it is determined if a new rule is needed. If a new rule is not needed, the process returns to block 520. If it is determined that a new rule is needed, at block 532 a new rule is added to the set of rules that are used by the action engine 472 (FIG. 4) and/or in the process steps 514 and 516 in FIG. 5A to determine if an action is performed. The above-provided process flow illustrates a process flow that may be implemented by the user-space virtualization layer shown in FIGS. 2-4 to implement user-level API hooking with machine learning. A machine learning operation may be implemented on the recorded events to set rules based on identified patterns.

User-Level API Hooking with Resource Access Control (e.g., an Allow or Block Function)

User-level API hooking can be used to implement security features at the application level. For example, user-level API hooking can be used to implement security features that involve controlling access to computing resources such as files, registries, processes, threads, services, inter process communications, network communications, database resources, etc. Such security features may include light weight, application level security components such as a micro-firewall, a micro-name server, a built-in micro-anti-virus feature, web browser security, etc., which could be applied on specific applications.

In an embodiment, a firewall feature (also referred to as a "micro-firewall") is implemented through user-level API hooking. The micro-firewall feature is used to control movement of data into and out of a computing system. Typical firewall products act at a system level, where an administrator configures rules to impose restrictions on connections/data being transferred to and from the application.

In an embodiment, implementing a micro-firewall with user-level API hooking involves tracking WINDOWS socket calls such as, for example: Connect (Ws2Connect); Bind; Listen; Socket (Ws2Socket); Send (Ws2Send); Recv (Ws2Recv); SendTo; and ReceiveFrom. When any of the above events get triggered, the event is hooked at the user-space virtualization layer and the IP address and/or hostname and/or port number is extracted and a corresponding set of micro-firewall rules are applied against the extracted information. The micro-firewall rules may include a "blocked list," which includes values of fields such as IP address, hostname, and/or port number, that should be blocked from some action, e.g., blocked from allowing a connection to be established. If an extracted value of, for example, an IP address, hostname, and/or port number, is found in the blocked list, then that connection is not allowed. In the case of packets being sent over a User Datagram Protocol (UDP) connection using, for example, SendTo( ) or ReceiveFrom( ) APIs, then the source/destination machine's information is extracted from the function arguments and rules are applied over the extracted function arguments.

Using user-level API hooking, a user that has a right to run an application (but that may not have administration rights) will be able to monitor and control the connections/data transferred to and from the application. In an embodiment, the user-space virtualization layer hooks into WINDOWS APIs at the NT level, including network/socket calls. For example, connections are made using WinSock's Connect call. As the user-space virtualization layer hooks into the Connect, Bind, SendTo and ReceiveFrom APIs, the virtualization logic can be configured to control whether to allow or disallow a particular connection. Logic implemented through the user-space virtualization layer gives the user-space virtualization layer control at a micro-level (e.g., at a per-application and/or per-user level instead of only at a system wide level as in the case of a firewall that is included in the operating system), thus enabling a light-weight firewall that is specific to the application. The micro-firewall rules could be enforced at a system level, a per-user level, and/or a per-application level.

User-level API hooking can be applied in various ways to implement a firewall feature. In an embodiment, user-level API hooking is used to identify certain packet header information. For example, the user-space virtualization layer could be configured to intercept an IP address and/or port number being passed within a User Datagram Protocol (UDP) packet by hooking into the SendTo/RecvFrom functions, which may contain IP addresses and port number information. The corresponding SendTo/RecvFrom functions can then be allowed or blocked based on a preconfigured set of rules that are part of a configuration file of the user-space virtualization layer.

In an embodiment, user-level API hooking is used to identify certain data in a communication. For example, the user-space virtualization layer can intercept the data being used for connections to impose rules. In an embodiment, an SQL connect call will contain a username/hostname apart from a server name, database name, etc. The username/hostname information could be extracted from the data by hooking into SQL APIs and a suitable action could be performed to allow or block the function associated with the API. Likewise, general client/server applications sending credentials within a packet could be intercepted and blocked according to a set of rules.

In an embodiment, user-level API hooking is used to block malicious connections (e.g., through RAW Sockets). For example, user-level API hooking can be used to block an application from creating a RAW socket. RAW sockets are the internet sockets that allow direct sending and receiving of IP packets without any protocol-specific transport layer formatting. RAW sockets could be used by hackers to intercept, modify, and/or extract packets from layer 2 (of the OSI model, e.g., the Ethernet layer), thus, posing a serious security threat to a computing system. User-level API hooking could be used to block such calls at the user-space even before the calls reach the operating system. Thus, providing an extra check on malicious code.

In an embodiment, user-level API hooking is used to implement subnet-level restrictions (e.g., blocking public IP addresses). In the case of general applications, more generic rules could be applied such as allowing communication only on an internal network and blocking all connections to/from an external network (e.g., the Internet). Such subnet-level restrictions could be used to prevent certain machines from accessing outside of an internal network while allowing the machines to communicate over an internal subnet.

FIG. 6 illustrates a set of action rules that may be enforced by an action engine of the user-space virtualization layer (see FIG. 4) to implement a micro-firewall feature. In the example of FIG. 6, the set of action rules of the micro-firewall dictates that user "Tom" from the domain "Doctor" is allowed to communicate with the machines on the same subnet, while user "Tom" is blocked from making connections to outside networks (e.g., the Internet).

FIG. 7 illustrates a set of action rules that may be enforced by the action engine of the user-space virtualization layer (see FIG. 4) to implement a micro-firewall for an SQL server application. "SQLCMD" is a console application (e.g., a utility tool) that is used for querying MICROSOFT SQL Server. Using user-level API hooking, SQLCMD can be started and the Connect function can be hooked into. To impose micro-firewall rules, a user could write a text file to instruct the action engine of the user-space virtualization layer to implement a set of action rules. FIG. 7 illustrates an example set of action rules. In the example of FIG. 7, when user "Tom" from domain "Doctor" tries to connect to the server "Admin-Database," then the micro-firewall blocks the connection. Whereas, when the user "Tom" tries to connect to server "Patient-Database," Tom is allowed access to the server "Patient-Database" based on the set of rules for the micro-firewall.

In an embodiment, an antivirus feature (also referred to as a "micro-antivirus") is implemented through user-level API hooking. For example, user-level API hooking is used to implement a built-in micro-antivirus feature at the application level that can monitor activity performed by the application and that can generate patterns for machine learning.

In an embodiment, patterns generated based on monitoring activity of an application are used to detect malicious activity and to take actions, such as triggering alerts or blocking the malicious activity.

In an embodiment, a micro-antivirus feature is configured to monitor file, registry, process, network, database, and services related activities that are performed by the application and to store information related to the activities to identify usage patterns (e.g., through the application pattern recognition algorithms) and to update/generate rules as described above with reference to FIGS. 4, 5A, and 5B. Examples of events that may be monitored to implement an antivirus feature using user-level API hooking include:

File APIs such as: CreateFile; WriteFile; DeleteFile; CloseFile; ReadFile; WriteFile; CopyFile; MoveFile.

Registry APIs such as: RegCreateKey; RegOpenKey; RegSetKeyValue; RegSetValue; RegSaveKey; RegDeleteKey; RegDeleteValue; RegEnumKey; RegQueryInfoKey.

Process/Thread/Service/COM/DLL APIs such as: CreateProcess; CreateProcessInternal; CreateThread; NtOpenSection; StartService; OpenService; CoCreateInstance; LoadDll; LoadLibrary.

Network APIs such as: Connect (Ws2Connect); Bind; Listen; Socket (Ws2Socket); Send (Ws2Send); Recv (Ws2Recv); SendTo; ReceiveFrom.

Database APIs such as: SQLConnect; SQLExecDirect.

In an embodiment, monitored events may be recorded in a "training" process. For example, operations recorded from monitored events can be used to generate a training set of data for "supervised learning." For example, the training set is generated while running the application in a controlled environment (e.g., a lab, a quality assurance (QA) setting, user acceptance testing (UAT), etc.), where the possibility of malicious activity occurring is removed. Such training sets can then be stored in the machine learning patterns database and used as a reference, or baseline, by the machine learning engine (see FIG. 4) to determine which operations could be trusted as genuine. In an embodiment, the training set may include information such as: file information (e.g., path of file being accessed, its file name and extension, etc.); registry information (path of registry getting accessed, registry key name, value being set, etc.); process information (e.g., name of process getting created, full path, arguments, etc.); network information (e.g., machine details like IP address, port number, hostname); and database information (e.g., server name, IP address, port number, username, SQL query details, etc.).

Such data collected in a controlled environment (e.g., an environment that is free from malicious activity) forms a training set for the machine learning engine. FIG. 8 is an example of data collected during a training operation, also referred to as a "training set." The duration of a training period can vary from application to application depending on, for example, the complexity of the application and upon the number of workflows involved. For simple applications with a fewer number of workflows, the total time taken to generate a training set may be relatively small (e.g., on the order of hours). Whereas, for more complex applications, the training period could range from days to weeks. In an embodiment, once all the major work flows of the application are exercised (e.g., the application is run through a certain set of operations), a baseline data set is established from which outliers (e.g., suspicious events) can be identified.

After a reference, baseline, or training set is established, an application is deployed to a production environment (e.g., to user machines in the field). Events are monitored using user-level API hooking and interesting events are provided to the machine learning patterns database as described above with reference to FIGS. 4, 5A, and 5B. If there is suspicious activity noticed in the event monitoring that is not part of a training set, then the action engine can take appropriate action (such as triggering an alert, blocking the operation, etc.). Additionally, the machine learning engine may evaluate the data in the machine learning pattern database to see if any action rules need to be updated or added. For example, assume that the user-space virtualization engine records a new operation that was not in the corresponding training set and that looks suspicious. An example of monitored events that appear to be suspicious activity is illustrated in FIG. 9A. In FIG. 9A, the operations corresponding to the monitored events that look suspicious are underlined. In an embodiment, the machine learning engine determines whether or not an operation is suspicious based on two criteria: the operation has not been seen before relative to a "baseline" pattern or "training set" that was established during a "training period;" and the activity matches with a pre-programmed set of "black-listed rules." For example, creating an executable file (e.g., an ".exe" file) with execute permission in "C:\Program Files" or copying some file from an unrecognized network share or tampering with WINDOWS host file or adding some registry setting for an allowed user or creating a process with an unknown extension (e.g., ".clk").

In an embodiment, the user-space virtualization layer identifies activities as "normal" (i.e., non-suspicious) based on factors such as: the activity/event was found in the training set (hence it is a trusted operation); and/or the activity/event was marked "SAFE" in a set of rules of the machine learning engine through a feedback loop.

In an embodiment, the user-space virtualization layer identifies activities as "suspicious" based on factors such as: the operation was on a "black-list," which was pre-programmed, e.g., by an experienced technician; and/or the activity/event was marked as "UNSAFE" in the set of rules of the machine learning engine through the feedback loop.

In an embodiment, the user-space virtualization layer tracks operations and may generate an alert and/or block an operation depending on the set of rules. FIG. 9B illustrates that certain operations corresponding to the monitored events have been blocked or that alerts have been generated in response to certain monitored events but the corresponding operations are not necessarily blocked.

In an embodiment, an administrator can approve an action or revert the action. FIG. 9C illustrates administrator actions that are taken on some of the monitored events shown in FIGS. 9A and 9B. Based on the administrator's action, the rules in the action engine may be updated. This can be referred to as "supervised learning." The resulting feedback can be fed into the rule set of the machine learning engine through the feedback loop. For example, an administrator might revert the operation of creating an executable file (e.g., a ".exe" file). In an embodiment, such actions get recorded in the rule set of the machine learning engine so that if a similar event is subsequently encountered, then the action engine of the user-space virtualization layer could automatically take a specified action.

In an embodiment, three repositories form the basis for a knowledge base for the machine learning engine to set rules for taking action in the future. With reference back to FIG. 4, the three repositories include: a training set (e.g., generated in controlled environment); black-list rules (e.g., pre-programmed by an experienced technician); and rules fed into the rule set of the machine learning engine through a feedback loop as SAFE or UNSAFE (supervised learning). In an embodiment, the sequence of operations performed, and the corresponding action taken against each operation is used to recognize a set of patterns across various applications.

Using user-level API hooking, network addresses (e.g., IP addresses and port numbers) can be redirected based on pre-configured rules to implement a "micro-gateway" feature. In an embodiment, if an application requires/has hard-coded an IP address and port number which the application has to connect to, then using the micro-gateway feature, the IP address and port number could be changed at the application level without modifying the code of the application. In operation, the user-space virtualization layer hooks into Winsock's Connect( ) and Bind( ) APIs and changes the IP address and port number based on preconfigured rules. The application is not aware of the change in IP address and port number and will function normally. FIG. 10 illustrates an example of a rule set to implement a micro-gateway using user-level API hooking. Using network redirection, an isolation layer could also be implemented to prevent traffic flowing to a specified machine or domain or groups.

In an embodiment, user-level API hooking can be used to implement code security at the application level to, for example, fix loop holes in code without any code changes. Such a technique could be used to improve code security in legacy applications to, for example: migrate applications to the latest platforms by redirecting operations from reserved locations to user accessible paths (e.g., C:\Program Files); deprecated APIs to modern ones; fixing global mutex/sempahores; fixing system wide WINDOWS Hooks (Web Apps); and insecure calls to secure APIs (Client-Server Apps).

Other features that may be implemented using user-level API hooking include a micro-name resolution system (along the lines of DNS client), where name resolution functionality is implemented within the application, micro-web security that acts as a web traffic analyzer, and a micro-proxy server that acts as an application level proxy server.

Application Sandbox

In an embodiment, an application sandboxing feature can be implemented through user-level API hooking. Application level sandboxing can be enabled when the application is packaged (e.g., in controlled environment) or at runtime (e.g., after the application is deployed and is running on a computing system). Application sandboxing can isolate a virtualized application from the underlying operating system and/or can isolate the virtualized application from other applications. User-level API hooking can be used to implement a sandboxed file system, a sandboxed registry, sandboxed network access, sandboxed inter process communication, and a sandboxed kernel object.

File System Sandbox

In an embodiment, user-level API hooking is used to implement a sandboxed file system. For example, the user-space virtualization layer hooks into the filesystem API calls (e.g., CreateFile, WriteFile, DeleteFile, CloseFile, ReadFile, WriteFile, CopyFile, and MoveFile) and restricts/blocks the corresponding operation according to a set of rules. For example, a file system operation will be blocked if the application is trying to navigate to any location on the file system that the user/container does not have access rights to. Thus, user-level API hooking can be used to limit the container by restricting file system access to locations within the sandbox (e.g., within the container's location) unless explicitly allowed in the configuration rules of the user-space virtualization layer, e.g., the resource is on an "allowed list" or a "white list."

Figure 11A:
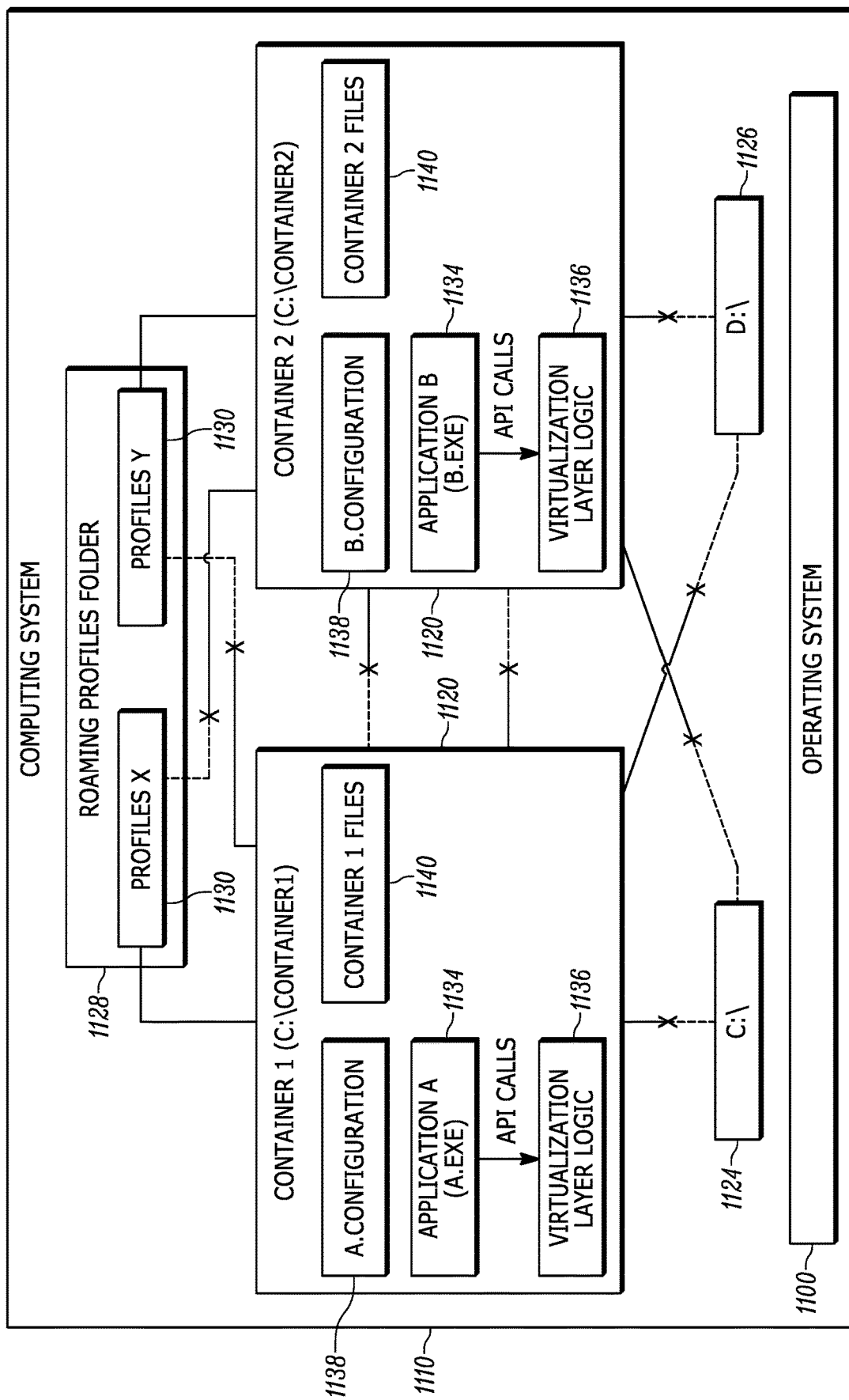
FIG. 11A depicts a computing system that uses user-level API hooking to control access to file systems within the computing system.

FIG. 11A depicts a computing system 1110 that includes an operating system 1100, two containerized applications 1120 (container 1 that includes application A and container 2 that includes application B), a persistent memory C 1124 (e.g., "C:" drive), a persistent memory D 1126 (e.g., "D:" drive), and a memory 1128 that includes two roaming profile folders 1130. Each container includes an executable file 1134 (A.exe and B.exe), virtualization layer logic 1136, a configuration file 1138 (A.configuration and B.configuration), and container-specific files 1140 (Container1 files and Container2 files). The configuration files include configuration information for the user-space virtualization layer and the user-space virtualization layer enforces the boundaries of the corresponding container. FIG. 11A also illustrates file system access rules that are implemented through user-level API hooking to control access to file systems within the computing system. As illustrated in FIG. 11A, application A of container 1 has access to files within container 1 and access to a roaming profile folder (as indicated by a solid connecting line) but application A does not have access to the C: drive, to the D: drive, to any files in container 2, or to any other roaming profile folder (as indicated by the line divided into a solid portion and a dashed portion at an "X"). Also as illustrated in FIG. 11A, application B of container 2 has access to files within container 2 and access to a roaming profile folder (as indicated by a solid connecting line) but application B does not have access to the C: drive, to the D: drive, to any files in container 1, or to any other roaming profile folder (as indicated by the line divided into a solid portion and a dashed portion at an "X"). An example of pseudo code that can be used to implement file system sandboxing is a follows:

```
FileSystem Sandboxing Example
If(Container1.File_To_Open ==
(Container1.Allowed_Files_From_RulesConfig[ ] || Container1.Files[ ])
{NtOpenFile (Container1.File_To_Open)}
Else
{return ACCESS_DENIED}
```

According to the pseudo code, only requests to open a file from locations within container 1 will be allowed. Although not included in the example, the pseudo code may include exceptions for certain operations and/or for certain file locations such as the roaming profile folders as illustrated in FIG. 11A.

FIG. 11B depicts example file system API calls made by application A in container 1 and corresponding actions that illustrate a sandboxed file system. As illustrated in FIG. 11B, requests from application A to implement file related operations outside of container 1 are denied and requests from application A to implement file related operations inside of container 1 are allowed.

Registry Sandbox

In an embodiment, user-level API hooking is used to implement a sandboxed registry. For example, the user-space virtualization layer hooks into the registry API calls (e.g., RegCreateKey, RegOpenKey, RegSetKeyValue, RegSetValue, RegSaveKey, RegDeleteKey, RegDeleteValue, RegEnumKey, and RegQueryInfoKey) and restricts/blocks the corresponding operation according to a set of rules. For example, a registry operation will be blocked if the application is trying to navigate to any location in the registry that the user/container does not have access rights to. Thus, user-level API hooking can be used to control the container by restricting registry access to within the sandbox (e.g., within the container's location) unless explicitly allowed in configuration rules of the user-space virtualization layer, e.g., the resource is on an "allowed list" or a "white list."

Figure 12A:
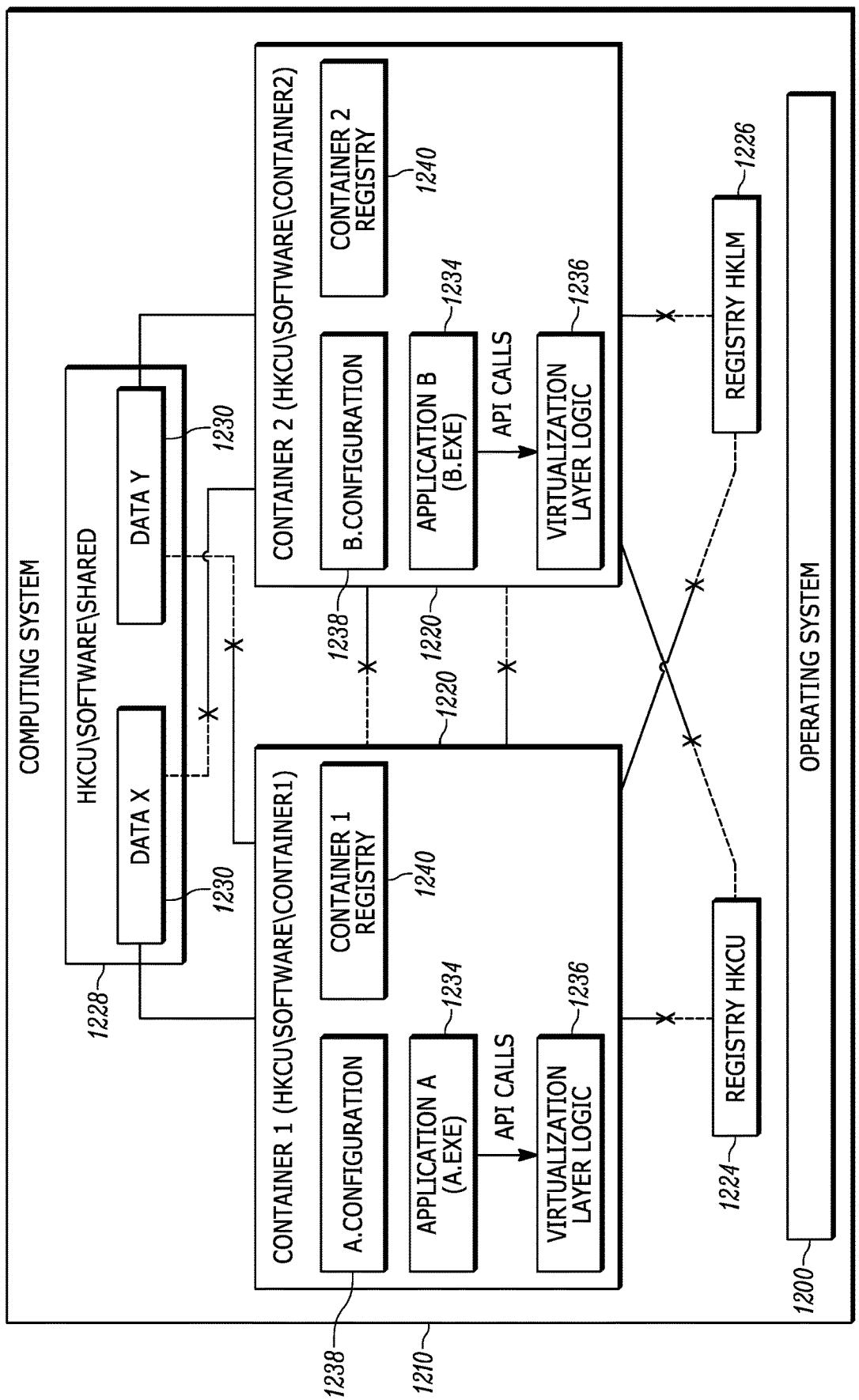
FIG. 12A depicts a computing system that uses user-level API hooking to control access to registries within the computing system.

FIG. 12A depicts a computing system 1210 that includes an operating system 1200, two containerized applications 1220 (container 1 that includes application A and container 2 that includes application B), a registry HKCU 1224, a registry HKLM 1226, and a memory 1228 that includes two roaming registries 1230 (data X and data Y). Each container includes an executable file 1234 (A.exe and B.exe), virtualization layer logic 1236, a configuration file 1238 (A.configuration and B.configuration), and container-specific registries 1240 (Container1 registries and Container2 registries). The configuration files include configuration information for the user-space virtualization layer and the user-space virtualization layer enforces the boundaries of the corresponding container. FIG. 12A also illustrates registry access rules that are implemented through user-level API hooking to control access to registries within the computing system. As illustrated in FIG. 12A, application A of container 1 has access to registries within container 1 and access to a roaming registry (data X) (as indicated by a solid connecting line) but application A does not have access to the registry HKCU, to the registry HKLM, to any registries in container 2, or to any other roaming registry (registry Y) (as indicated by the line divided into a solid portion and a dashed portion at an "X"). Also as illustrated in FIG. 12A, application B of container 2 has access to files within container 2 and access to a roaming registry (data Y) (as indicated by a solid connecting line) but application B does not have access to the registry HKCU, to the registry HKLM, to any registries in container 1, or to any other roaming registry (data X) (as indicated by the line divided into a solid portion and a dashed portion at an "X"). An example of pseudo code that can be used to implement file system sandboxing is a follows:

```
        If(Container1.RegKey_To_Be_Created ==
        (Container1.Allowed_RegKeys_From_RulesConfig[ ] || Container1.
RegKeys[ ])
        {NtCreateKey (Container1.RegKey_To_B_Created) }
        Else
        {return ACCESS_DENIED}
```

According to the pseudo code, only requests to create a registry at locations within container 1 will be allowed. Although not included in the example, the pseudo code may include exceptions for certain operations and/or registry locations.

FIG. 12B depicts example registry API calls made by application A in container 1 and corresponding actions that illustrate a sandboxed registry system. As illustrated in FIG. 12B, requests from application A to implement registry related operations outside of container 1 are denied and requests from application A to implement registry related operations inside of container 1 are allowed.

Network Access Sandbox

In an embodiment, user-level API hooking is used to implement sandboxed network access. For example, the user-space virtualization layer hooks into the socket API calls (e.g., Connect (Ws2Connect), Bind, Listen, Socket (Ws2Socket), Send (Ws2Send), Recv (Ws2Recv), SendTo, and ReceiveFrom) and restricts communication according to a set of rules. For example, network access operations will be blocked if the application is trying to send or receive traffic from any location on the network that the user/container is not allowed to communicate with. Network access sandboxing through user-level API hooking can also be configured to restrict applications from sending/receiving data to/from restricted ports on the same computing system. Thus, the network access sandboxing technique can limit a container's network access to specific IP addresses and port numbers.

```
        If( (Container1.IP_To_Be_ConnectedTo == Container1.Allowed_IP) )
        && (Container1.Port_To_Be_ConnectedTo ==
Container1.Allowed_Port)
        {Connect (Container1.IP_To_Be_ConnectedTo ,
Container1.Port_To_Be_ConnectedTo) }
        Else
        {return ACCESS_DENIED }
```

According to the pseudo code, only requests to connect to certain allowed IP addresses and port numbers will be allowed. Although not included in the example, the pseudo code may include exceptions for certain operations, IP addresses, and/or port numbers.

FIG. 13 depicts example network access API calls made by application A in container 1 and corresponding actions that illustrate sandboxed network access. As illustrated in FIG. 13, requests from application A to implement network access related operations outside of container 1 are denied and requests from application A to implement network access related operations inside of container 1 are allowed.

IPC Sandbox

In an embodiment, user-level API hooking is used to implement sandboxed inter process communication (IPC). For example, the user-space virtualization layer hooks into the IPC API calls (including but not limited to socket (networking) APIs, RPC (Remote Procedure Call) APIs, Pipes, COM APIs (Component Object Model), FileMapping APIs etc.). The user-space virtualization layer then imposes checks on the IPC APIs to make sure that, for example, the virtualized process does not communicate with other processes on the computing system that are not within its sandbox. Alternatively, the user-space virtualization layer may be configured to allow IPC calls to and from specific applications that the sandboxed application has been explicitly permitted to communicate with (e.g., based on a predefined rules set that is established during application packaging). In an embodiment, all other IPC requests are be blocked.

FIG. 14 depicts example IPC API calls made by application A in container 1 and corresponding actions that illustrate sandboxed inter process communication. As illustrated in FIG. 14, requests from application A to implement inter process communication related operations outside of container 1 are denied and requests from application A to implement inter process communication related operations inside of container 1 are allowed.

Sandboxed/Virtualized Kernel Objects (Semaphores, Mutex, Events)

In an embodiment, the user-space virtualization layer is configured to hook into the kernel object API calls including but not limited to semaphores, mutex, events, etc. The user-space virtualization layer is configured to impose checks on all the kernel object APIs to make sure that the virtualized process does not use kernel objects created by other processes on the machine that are not in the corresponding sandbox. Alternatively, the user-space virtualization layer may allow the use of kernel object created by specific applications that the sandboxed application has been explicitly permitted to communicate with (e.g., based on predefined rules set while packaging the application). In an embodiment, all other kernel object requests will be blocked.

FIG. 15 depicts example kernel object API calls made by application A in container 1 and corresponding actions that illustrate sandboxed kernel objects. As illustrated in FIG. 15, requests from application A to implement kernel object related operations outside of container 1 are denied and requests from application A to implement kernel object related operations inside of container 1 are allowed.

In an embodiment, if a kernel object redirection rule is preconfigured (e.g., in the configuration file of the user-space virtualization layer), then the user-space virtualization layer will redirect (instead of block) the kernel object to a new name (e.g., by appending_ProcessID to the kernel object's name). Thus, a new kernel object is created specifically for that process, referred to as kernel object virtualization. FIG. 16 depicts an example kernel object API call made by application A in container 1 and corresponding actions that illustrate a virtualized kernel object. As illustrated in FIG. 16, requests from application A to implement kernel object related operations outside of container 1 are redirected to form a unique kernel object (e.g., by appending a unique identifier to the kernel object name, for example, a ProcessID). Thus, a kernel object is virtualized (e.g., by creating a virtual kernel object).

Blocking/Restricting Process Creation at Runtime

In an embodiment, the user-space virtualization layer is configured to hook into process creation related API calls (e.g., CreateProcess, CreateProcessInternal, CreateThread, NtOpenSection, StartService, OpenService, CoCreateInstance, LoadDLL, and LoadLibrary) and to perform an action according to a set of rules, e.g., to block any unauthorized process from getting created. The user-space virtualization layer can be configured to ensure that a virtualized process does not spawn a restricted process. Alternatively, the user-space virtualization layer may be configured to allow the virtualized process to launch processes from within its own sandbox or any other process if it has been specifically preconfigured or explicitly white listed in the rules. In an embodiment, all other processes are blocked. FIG. 17 depicts example process API calls made by application A in container 1 and corresponding actions that illustrate a sandboxed process. As illustrated in FIG. 17, requests from application A to implement process related operations outside of container 1 are denied and requests from application A to implement process related operations inside of container 1 are allowed.

Blocking/Restricting APIs at Runtime (Including Dynamically Loaded Functions, Documented and Undocumented Functions Like CreateProcessInternalW)

In an embodiment, the user-space virtualization layer is configured to hook into various APIs and to block restricted function calls. Through such user-level API hooking, the user-space virtualization layer can implement security features so that users cannot invoke insecure/potentially harmful functions (e.g., WINDOWS 10S operating system, which is more restricted in terms of user allowed activities). If there is a requirement to restrict an application from invoking certain functions (e.g., LoadDLL, CreateProcessInternal, etc.), then the user-space virtualization layer can be configured to hook into the API call and to return the API call (instead of calling the original function). The user-space virtualization layer may also be configured to restrict applications from invoking functions dynamically. In such cases, applications may use the GetProcAddress function to find the address of a function within a DLL at runtime. To block such an API call, the user-space virtualization layer is configured to hook into the GetProcAddress function and to return a "function not found" message. Accordingly, all dynamically called functions are blocked (unless explicitly white listed).

Guard Against DLL Injection (from WINDOWS Hooks, Calls from Kernel Dispatch Table, Etc.)

In an embodiment, the user-space virtualization layer is configured to hook into various DLL loading APIs (e.g., LoadLibrary, LoadDLL) and to impose checks on the DLLs being loaded. In an embodiment, the user-space virtualization layer is capable of tracking DLL injection using mechanisms like WINDOWS Hooks. If a non-virtualized process tries to inject a DLL into a virtualized process, then the user-space virtualization layer blocks the DLL from getting injected by hooking into DLL Load APIs and returning a "DLL Not loaded" error whenever an application tries to load a restricted/black listed DLL. Thus, the sandboxed application is protected from DLLs being injected by other processes.

Examples of events that can trigger an allow/block action and/or machine learning activity include: inter process communication (IPC) APIs; filesystem APIs; registry APIs; socket APIs; database APIs; and web APIs. In an embodiment, the user-space virtualization layer hooks into such APIs at the NTDLL level (e.g., before the APIs reach the kernel level) when the process is running, e.g., on an end-user's machine. This gives the virtualizer a chance to take control of the API calls before they reach the kernel drivers. In an embodiment, the virtualizer monitors all such calls and may record, block, modify, and/or redirect the paths based on the configuration of the user-space virtualization layer and/or send the information as a notification to the machine learning engine. In an embodiment, the machine learning engine identifies patterns based on the sequence of events that are identified by the user-space virtualization layer and stored in the machine learning patterns database. Actions may be taken based on preprogrammed rules and/or based on rules updated/set based on machine learning. Examples of actions that can be implemented through a user-space virtualization layer include: blocking unauthorized operations at a per-user and/or per-application basis to impose security restrictions; monitoring unsecure applications and restricting/blocking untrusted operations, which might affect memory, filesystem, network, database resources etc; monitoring application activity patterns to detect any unusual activity (generally performed by malware software) and alert or block the operations before reaching the operation system (e.g., the kernel-space); modifying calls to make the calls more secure (e.g., to correct bad programming practices); pre-fetching files to improve disk access performance (e.g., especially remotely hosted files); predicting network resources which could be used by the application; predicting database queries and pre-fetching the data; and/or predicting web queries and pre-fetching the data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, RAM, ROM, a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for executing a virtualized application on a computing system that includes a user-space and a kernel-space, the method comprising:
    executing an application in the user-space, wherein the application is launched from a container that includes the application and a user-level virtualization layer, the user-level virtualization layer included in the container including virtualization layer logic and virtual configuration files;
    executing the user-level virtualization layer in the user-space, the user-level virtualization layer including a set of rules;
    performing, via the user-level virtualization layer, user-level hooking of events that are generated by the executing application according to the set of rules to identify events of interest; and
    determining whether to allow or block a function corresponding to an event that is identified as an event of interest based on the set of rules in the user-level virtualization layer;
    wherein the virtualization layer logic included in the container is configured to hook and interpret events that are generated by the executing application and to interact according to the set of rules with the virtual configuration files to generate virtualized events;
    wherein determining whether to allow or block a function corresponding to an event that is identified as an event of interest based on the set of rules in the user-level virtualization layer comprises determining if the function relates to a resource that is outside of a pre-established location; and
    further comprising:
        blocking the function corresponding to an event if the function relates to a resource that is outside of the pre-established location unless the function corresponds to a resource that is on an allowed list;
        storing events that are identified as events of interest in a database;
        applying a pattern recognition process to the events that are stored in the database;
        generating a rule for the set of rules in the user-level virtualization layer based on the pattern recognition process; and
        applying the generated rule through the user-level virtualization layer.

2. The method of claim 1 wherein determining whether to allow or block a function corresponding to an event that is identified as an event of interest based on the set of rules in the user-level virtualization layer comprises extracting at least one of an internet protocol address, a hostname, and a port number from the event and comparing the extracted at least one of an internet protocol address, a hostname, and a port number to a list to determine if the at least one of an internet protocol address, a hostname, and a port number is on the list.

3. The method of claim 1 further comprising blocking a communication function based on an internet protocol (IP) address corresponding to an event that was identified as an event of interest.

4. The method of claim 1 further comprising blocking a communication function based on a hostname corresponding to an event that was identified as an event of interest.

5. The method of claim 1 further comprising blocking a communication function that corresponds to an event that was identified as an event of interest if the function relates to a socket call.

6. The method of claim 1 wherein determining whether to allow or block a function corresponding to an event that is identified as an event of interest based on the set of rules in the user-level virtualization layer comprises determining if the event is found in a training set and blocking the function corresponding to the event if the event is not found in the training set.

7. The method of claim 1 wherein determining whether to allow or block a function corresponding to an event that is identified as an event of interest based on the set of rules in the user-level virtualization layer comprises determining if the event is found on a black list and blocking the function corresponding to the event if the event is found on the black list.

8. The method of claim 1 further comprising blocking the function corresponding to an event if the function relates to a resource that is outside of the pre-established location.

9. The method of claim 1 wherein generating a rule for the set of rules in the user-level virtualization layer based on the pattern recognition process comprises updating an existing rule.

10. The method of claim 1 wherein generating a rule for the set of rules in the user-level virtualization layer based on the pattern recognition process comprises generating a new rule.

11. The method of claim 1 wherein the user-level virtualization layer includes a virtual file store that includes files that are within a namespace that is specific to the user-level virtualization layer and that can be accessed without operating system administration rights.

12. The method of claim 1 wherein the user-level virtualization layer is invoked as a separate application at the user-level, and wherein the user-level virtualization layer spawns the application and hooks into the application without requiring operating system admin rights.

13. A system for running an application via an operating system executing on a computing device, the system comprising:

at least one processing unit and memory;

an operating system stored on the memory; and a container stored on memory, the container including an application and a user-level virtualization layer, the user-level virtualization layer including virtualization layer logic and virtual configuration files;

wherein execution of the application and the user-level virtualization layer on the operating system involves;

executing the application in user-space;

executing the user-level virtualization layer in the user-space, the user-level virtualization layer including a set of rules;

performing, via the user-level virtualization layer, user-level hooking of events that are generated by the executing application according to the set of rules to identify events of interest; and determining whether to allow or block a function corresponding to an event that is identified as an event of interest based on the set of rules in the user-level virtualization layer;

wherein the virtualization layer logic included in the container is configured to hook and interpret events that are generated by the executing application and to interact according to the set of rules with the virtual configuration files to generate virtualized events;

wherein determining whether to allow or block a function corresponding to an event that is identified as an event of interest based on the set of rules in the user-level virtualization layer comprises determining if the function relates to a resource that is outside of a pre-established location; and further comprising:

blocking the function corresponding to an event if the function relates to a resource that is outside of the pre-established location unless the function corresponds to a resource that is on an allowed list;

storing events that are identified as events of interest in a database;

applying a pattern recognition process to the events that are stored in the database;

generating a rule for the set of rules in the user-level virtualization layer based on the pattern recognition process; and applying the generated rule through the user-level virtualization layer.

14. A non-transitory computer readable medium that stores computer-executable code, the computer-executable code comprising:

a container that includes an application and a user-level application virtualization layer, the user-level virtualization layer included in the container including virtualization layer logic and virtual configuration files;

the application and user-level virtualization layer comprising computer-executable code, which when executed by one or more processors performs:

executing the application in user-space;

executing the user-level virtualization layer in the user-space, the user-level virtualization layer including a set of rules;

performing, via the user-level virtualization layer, user-level hooking of events that are generated by the executing application according to the set of rules to identify events of interest; and determining whether to allow or block a function corresponding to an event that is identified as an event of interest based on the set of rules in the user-level virtualization layer;

wherein the virtualization layer logic included in the container is configured to hook and interpret events that are generated by the executing application and to interact according to the set of rules with the virtual configuration files to generate virtualized events;

wherein determining whether to allow or block a function corresponding to an event that is identified as an event of interest based on the set of rules in the user-level virtualization layer comprises determining if the function relates to a resource that is outside of a pre-established location; and further comprising:

blocking the function corresponding to an event if the function relates to a resource that is outside of the pre-established location unless the function corresponds to a resource that is on an allowed list;

storing events that are identified as events of interest in a database;

applying a pattern recognition process to the events that are stored in the database;

generating a rule for the set of rules in the user-level virtualization layer based on the pattern recognition process; and applying the generated rule through the user-level virtualization layer.

* * * * *